Oct. 7, 1969   S. A. WEIL ET AL   3,470,708
SOLID-ADSORBENT AIR-CONDITIONING DEVICE
Filed Oct. 12, 1967   2 Sheets-Sheet 1
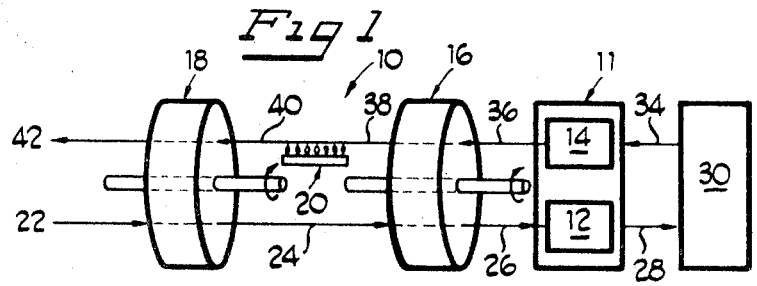
CONVENTIONAL SOLID-ADSORBENT AIR-CONDITIONING DEVICE
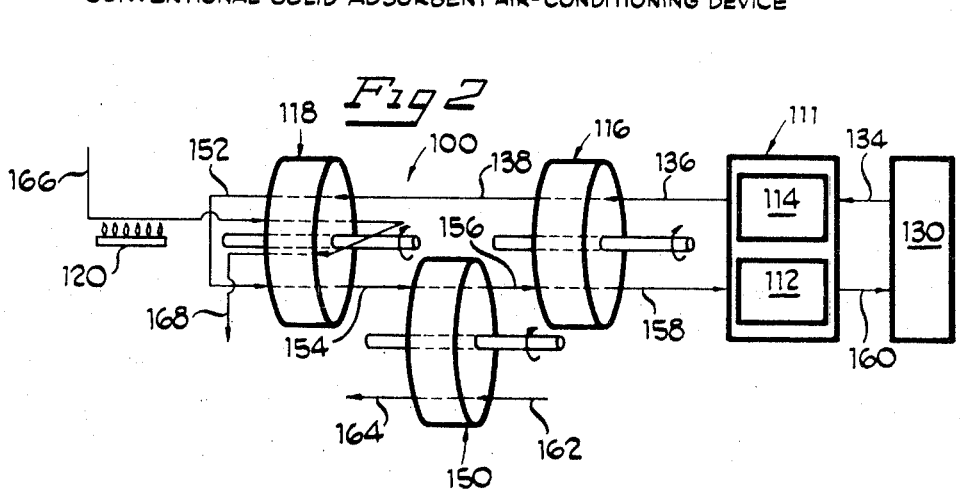
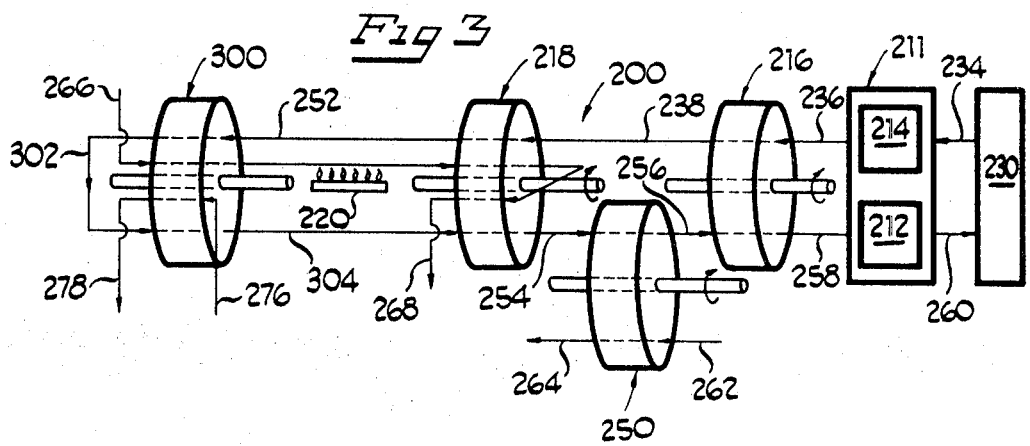
INVENTORS
WILLIAM R. STAATS
SANFORD A. WEIL
BY
Alexander & Speckman
ATTORNEYS United States Patent Office 3,470,708
Patented Oct. 7, 1969

3,470,708
SOLID-ADSORBENT AIR-CONDITIONING DEVICE
Sanford A. Weil and William R. Staats, Chicago, Ill., assignors to The Institute of Gas Technology, Chicago, Ill., a non-profit corporation of Illinois
Filed Oct. 12, 1967, Ser. No. 674,877
Int. Cl. F24f 3/14; F28d 19/04; B01j 1/22
U.S. Cl. 62—271                                6 Claims

ABSTRACT OF THE DISCLOSURE

An open cycle recirculating air-conditioning system having at least two heat transfer wheels to transfer sensible heat to and from air to be conditioned, a moisture transfer wheel to remove moisture from the air and a regenerative cycle including a heating section in the form of a gas-fired burner for heating the air cycled through the moisture transfer wheel.

BACKGROUND OF THE INVENTION

This invention relates, in general to air-conditioning and, in particular, to an improved solid-adsorbent air-conditioning system.

Open cycle air conditioners are well known in the art. One system, known as the Munters unit, is described in U.S. Patent No. 2,926,502. Basically, open cycle air conditioners like the Munters unit operate by dehumidification and subsequent cooling of air wherein warm moist air is conditioned by a three-stage process to produce cool, relatively dry air.

The efficiency and effectiveness of an open cycle air-conditioning system depends largely on the ability of the unit to dehumidify the warm, moist input air. Although various dehumidification means have been employed with open cycle air conditioners, none provides the higher effective dehumidification necessary for efficient operation on air of exceptionally high temperature and humidity.

SUMMARY OF THE INVENTION

It is an object of the present invention to provide an improved solid-adsorbent air-conditioning system.

Very generally, the system of the present invention includes a pair of heat transfer wheels and a moisture transfer wheel and at least one evaporator arranged such tht air from a room to be conditioned is sequentially passed through a portion of one heat transfer wheel, the moisture transfer wheel, the second heat transfer wheel, a second portion of the first heat transfer and the evaporator. The first heat transfer wheel is thus regenerated or cooled by the air leaving the room. The second heat transfer wheel is cooled by outside air and the moisture transfer wheel is regenerated by heated outside air.

The operation of the system is such that air from the conditioned room is passed through a saturator and then one of the two heat transfer wheels which raises the temperature of the air at constant absolute humidity. The heated air from the heat transfer wheel is then passed through the moisture transfer wheel to remove moisture from the air. The dried air is passed through the second one of the heat transfer wheels where it is cooled to near outdoor temperature, and then through the other one of the heat transfer wheels again which cools it to near room temperature. The air then is passed through a saturator where it is saturated with moisture to further cool it, and then to the conditioned room. Air leaving the room temperature. The air then is passed through a satucools the second heat transfer wheel.

An alternative embodiment of the invention is contemplated wherein an additional heat transfer wheel is utilized intermediate the moisture transfer wheel and the second heat transfer wheel.

This invention provides efficient operation in hot humid climates and by virtue of its configuration allows for use of a smaller moisture transfer wheel than was heretofore possible.

Also, this system allows placement of the regenerative burner at a safe distance from flammable heat transfer wheels, and requires less fuel than conventional units of equal capacity. It also allows for the use of lithium chloride for a drying agent even in humid climates.

The invention accordingly comprises the features of construction, combination of elements, and arrangement of parts which will be exemplified in the construction hereinafter set forth, and the scope of the invention will be indicated in the claims.

For a fuller understanding of the nature of the invention, reference should be had to the following detailed description taken in connection with the accompanying drawings.

DESCRIPTION OF THE DRAWINGS

FIG. 1 shows diagrammatically an open cycle air conditioning system which is exemplary of the prior art systems;

FIG. 2 is a similar diagram of the improved system of the present invention;

FIG. 3 is another similar diagram of an alternative design for the system of FIG. 2;

DESCRIPTION OF ILLUSTRATED EMBODIMENTS

Figure 4:
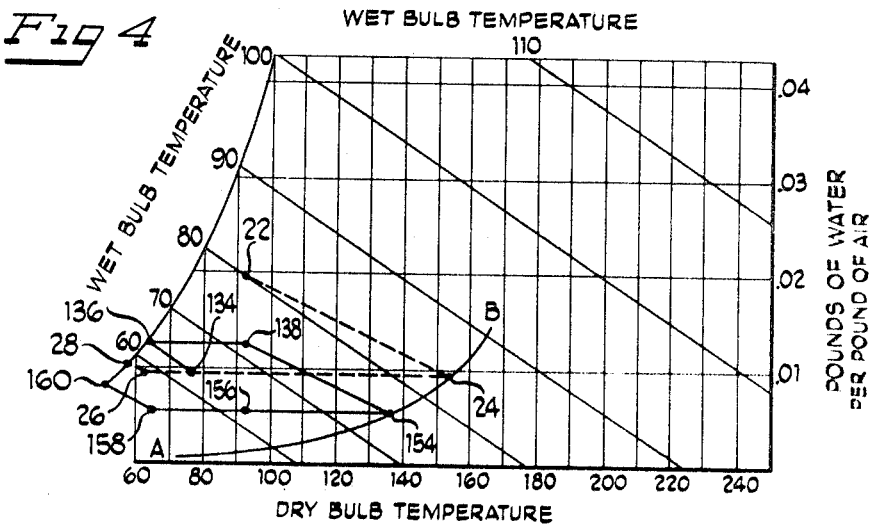
FIG. 4 is a psychrometric chart of the operation of the system of FIG. 2.

Referring now to the drawings, in FIG. 1 there is shown an open cycle solid-adsorbent air-conditioning system 10 which is exemplary of the prior art systems. The system is diagrammatically illustrated, all of the ductwork and fans or blowers needed for circulating the air having been removed for clarity. It is understood that each of the systems described includes appropriate ductwork defining separated flow paths for the air to be conditioned and the regenerative air required. This ductwork is arranged in a well known manner to expose the various streams of air to appropriate segmented portions of the elements of the system.

The system 10 comprises essentially four sections: an evaporating section 11 including evaporators 12 and 14, heat transfer wheel 16 for transfer of sensible heat to and from air (called an S-wheel); moisture transfer wheel 18 for transfer of latent heat of condensation (called an L-wheel) and a heating section 20.

In the evaporator section 11, water is supplied to evaporator pads or fins or other suitable mass transfer means for contracting air passing therethrough. The S-wheel 16 is a water-impervious rotatable cylindrical means for transferring sensible heat to or from air flowing herethrough. The L-wheel 18 is also typically a rotatable cylindrical means made of asbestos paper or other absorbent fire-resistant material which is impregnated with a hygroscopic substance capable of sorption of moisture from air passing thereover. Typical L- and S-wheel constructions are shown in the U.S. patent to Pennington, No. 2,700,537. The heating section 20 is typically a gas-fired burner for heating air passing therethrough.

The normal cooling operation of the open cycle air-conditioning system shown in FIG. 1 is as follows: Outside air 22 is introduced into a segmented portion of the rotating L-wheel 18 by a fan (not shown). Moisture in the air is sorbed by the hygroscopic material impregnated in the L-wheel, with the latent heat of condensation being taken up by the air, thus resulting in an air temperature increase. The incoming air therefore is heated and dehumidified in the L-wheel 18.

The resultant heated and relatively dry air 24 leaving the L-wheel 18 is then passed through a segmented portion of the rotating water-impervious S-wheel 16 which is relatively cool, and the air is cooled down with no change in moisture content. From the S-wheel 16, the relatively cool, relatively dry air 26 passes over the evaporator pads of the evaporator 12 of the evaporator section 10. The water is thereby evaporated and the air is humidified. Simultaneously, the latent heat of vaporization is extracted from the air thereby cooling it. The resulting air 28 is passed into a room 30 and is typically at a lower dry bulb temperature than the outside air, with about 95% relative humidity.

The regenerative half of the cycle is as follows: air 34 from the room 30 is passed over the evaporator pads of the evaporator 14. The air is cooled while the water is evaporated from the pads. The resultant cool, relatively moist air 36 is then passed over a segmented portion of the S-wheel 16 which has rotated into position and which is cooled thereby. All or part of the moist, heated air 38 from the S-wheel 16 then passes through the burner section 20 where its temperature is greatly increased. The heated air 40 from the burner section finally is passed over the wet portion of the L-wheel 18 which is dried by the hot gases which, in turn, are rejected to the outside 42. This completes the cycle.

In FIG. 2, there is illustrated, again diagrammatically, a solid-adsorbent open cycle air-conditioning system 100 exemplary of the present invention. It can be seen that this system likewise comprises essentially four sections: an evaporator section 111 having evaporator 112 and 114; an S-wheel 116 for transfer of sensible heat to and from air; an L-wheel 118 for transfer of latent heat of condensation and evaporization; and a heating section 120. The primary difference betwen the system 100 and the system 10 of FIG. 1 which is exemplary of most prior art systems, and the improvement of the former over the latter, is the addition of a second S-wheel 150 and the manner in which air is caused to flow through the entire system.

More specifically, with the system 100, air 134 from the room 130 is passed through evaporator 114 to condition 136 and then through a portion of the rotating inert heat-regenerating S-wheel 116 which raises the temperature of the air at constant absolute humidity to 138. The heated air 138 from the S-wheel 116 is then passed through a segmented portion of the rotating moisture-regenerating L-wheel 118 which removes moisture from it to 152. The dry air from the L-wheel 118 preferably is passed back through another quadrant of the L-wheel for further drying to 154, as illustrated. When the air is passed through L-wheel 118 in this fashion, the required thickness of the L-wheel is reduced since the air need not be dried to the desired degree on the first pass but it can be partially dried and then further dried on the second pass through it. The smaller L-wheel 118 also provides a corresponding reduction in the equipment size for the system.

The dried air 154 is next passed through a segmented portion of the inert heat-regenerating S-wheel 150 where it is cooled to near the outdoor temperature as at 156, and then through a portion of S-wheel 116 where it is cooled to near room temperature at 158. The air 158 from the S-wheel 116 then is passed through the saturator 112 where it is saturated with moisture resulting in further cooling to 160. The chilled air 160 from the saturator 112 is supplied to the room 130.

The second S-wheel 150 is cooled with outdoor air 162 which is then vented to the outdoors 164. The L-wheel 118 is dried by outdoor air 166 which is heated by burner 120 and then passed through the L-wheel. Thereafter, the heated air is likewise vented to the outdoors 168.

One of the improvements provided by the system 100 is that it takes air from the conditioned space, rather than outdoor air, and dries it with the adsorbent moisture-regenerating L-wheel 118. In most air-conditioning applications, indoor air contains less water vapor than outdoor air. This feature therefore allows the drying wheel such as the L-wheel 118 either to be smaller in size or to dry the air more, or both. Accordingly, a substantial improvement over conventional equipment of this type is provided since the system 100 will operate efficiently in hot, humid climates whereas the conventional systems will not.

It may be further noted that a system such as the system 100 need have only one saturator rather than two. Conventional systems, as illustrated in FIG. 1, must saturate the room air to obtain additional temperature wheel. With the system 100 of the present invention, it is not necessary to do this so that saturator 114 can be eliminated. In most cases, however, it will be desirable to saturate the room air to obtain additional temperature depression and more efficient use of water. The second saturator can be easily added to the system, in such an application. It may also be desirable, in certain applications to saturate outdoor air stream 162, which cools S-wheel 150.

In conventional equipment, the burners, such as the burner 20 of FIG. 1, are placed adjacent to the S-wheel which is a wax-coated wheel. This creates a serious fire hazard. In the system 100 of the present invention, this hazard is eliminated since the burner 120 is well separated from the S-wheels 116 and 150.

Also, less water is exchanged on the L-wheel 118 than on the L-wheels of conventional systems. Accordingly, less fuel is required to evaporate this water. The system 100, therefore, has a higher coefficient of performance.

The intrinsic higher capacity of the system 100 allows it to operate more satisfactorily with lithium chloride as a drying agent in humid climates. Conventional equipment usually does not have adequate cooling capacity in the humid climates when using lithium chloride. Lithium bromide can be used, in such cases, to improve the capacity of the conventional equipment, however, lithium bromide tends to decompose and release small amounts of bromine. Such a result is generally found to be undesirable.

It can therefore be seen from the above that the air conditioning system 100 of the present invention provides numerous advantages and features which are not generally available with the conventional systems of the prior art, the latter being generally illustrated in FIG. 1, by the system 10.

In FIG. 3 there is diagrammatically illustrated an air conditioning system 200 which is a variation or modification of the system 100. The system 200 is like the system 100 in that it has a pair of S-wheels 216 and 250, and L-wheel 218, a burner 220 and a saturator section 211 having saturators 212 and 214, all generally arranged in the same manner as described above to condition air from room 230. The system 200, however, has an additional inert, heat-regenerating S-wheel 300 which serves to cool the dried air 252 between passes through the moisture-regenerating L-wheel 218.

The air 234 from the room 230 first passes through evaporator 214 where it is cooled to 236. The cool moist air is next passed through S-wheel 216 where it is heated to 238. The heated air 238 then passes through L-wheel 218 where the air is dried and heated by virtue of the adsorption process to 252. This air is then cooled in S-wheel 300 to 302 and in a second pass through the S-wheel 300 cooled further to 304. This cooled, dry air is once again passed through L-wheel 218 where it is further dried (and, of course, heated) to 254. This air is then cooled by S-wheel 250 to condition 256, cooled again by S-wheel 216 to 258 and passed over evaporator 212 to condition 206 and delivered to room 230.

The advantage of this arrangement is that the dried air entering the L-whel 218 from the S-wheel 300 for the second drying pass is cooler and, therefore, more water can be removed by the dessicant in the L-wheel. The lower water content of this air results in a larger temperature depression at the saturator 212. Improved overall operation of the system 200 is thereby provided.

In system 200 as in the system 100, the cooling agent is the outdoor air 262 and 276. The outdoor air 262 is passed through S-wheel 250 and vented atmosphere at 264. The outdoor air 267 is passed through the S-wheel 200, and then is vented to the outdoors 278. Other outdoor air 266 is passed through the S-wheel 300 and then over the burner 200. After passing over the burner, it is used in the L-wheel 218 to remove moisture from the wheel and then vented at 268. A variety of similar configurations of the various air streams and wheel 300 also are possible.

To exemplify the improvements in performance of the systems of the present invention, the performance thereof were calculated on the following basis.

(1) Outdoor conditions: 92° F. with a wet-bulb temperature of 80° F. (corresponding to outdoor design conditions for Miami, Fla.).
(2) Desired indoor conditions: 76° F. with 50% relative humidity.

For comparison purposes, the operation of conventional equipment, such as the system illustrated in FIG. 1, has been calculated, on the same basis, using a psychrometric chart. The results are shown by the dashed lines on FIG. 4. The air conditioning process of the conventional equipment can be described as folows. Starting with the condition of the outdoor air 22 at 92° F. and with an 80° F. wet-bulb temperature, the air is dried by L-wheel 18 (and heated by the heat of adsorption of water on lithium chloride) to the condition 24, which lies on curve AB. Curve AB represents the equilibrium vapor pressure of pure lithium chloride. The air is then cooled by S-wheel 16 to 63° F. to 26. The temperature of the saturated room air entering the other portion of S-wheel 16 is also 63° F. The cooled air 26 is then saturated with the evaporator 12 to 28 and delivered to the room 30.

The operation of the system of FIG. 2 is shown by the solid lines of FIG. 4. Room air 134, at 76° F. and 50% relative humidity, is cooled by saturation 136 and warmed in S-wheel 116 (where it serves to cool the air re-entering the room) to 92° F. at 138. The air from the S-wheel 116 is then dried in L-wheel 118, reaching a temperature of 136° F. at 154. The air from the L-wheel 118 is then cooled to 92° F. at 156 in S-whel 150 (using outside air as the cooling medium for that wheel), and cooled further in S-wheel 116 to 63° F. at 158. Because this air 158 is drier than the air at the comparable position in a conventional system 26, it cools more when it is saturated with the evaporator 112 and can be delivered to the room at a lower temperature and lower absolute humidity as at 160.

Figure 5:
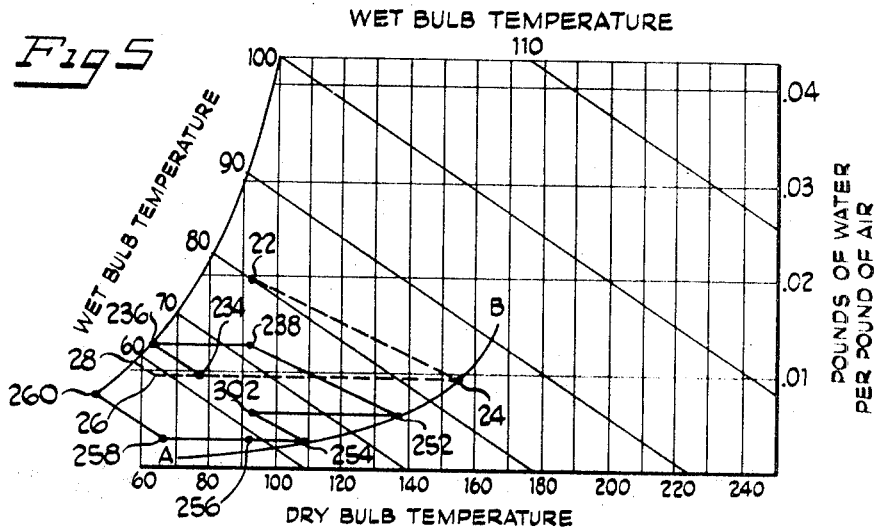
FIG. 5 is a psychrometric chart of the operation of the system of FIG. 3.

The operation of the system of FIG. 3 is shown by the solid lines on the psychrometric chart in FIG. 5. FIG. 5 also shows the operation of the conventional system, as in FIG. 4, for comparison. As shown in FIG. 5, this system operates exactly like the system of FIG. 2 for saturating room air 234 to cool it, warming it 238, and drying it 252. However, after drying the air it is cooled in S-wheel 300 to outdoor air temperature 92° F. to 302, and again dried in another portion of L-wheel 218, to 254. It is now only at 110° F. and therefore drier than the air at a comparable position in the system of FIG. 2, and very much drier than in the conventional system. Therefore, after it is cooled in S-wheel 250 to 92° F. 256, and cooled further in S-wheel 216 to 63° F. 258 and cooled by saturation with water in evaporator 212 to 260, it can be delivered to the room 230 at a lower temperature than both the system of FIG. 2 and the conventional system of FIG. 1.

On the basis of these psychrometric constructions, the ideal coefficient of performance for these devices and the amount of cooling they produce from evaporating one pound of water were calculated. This information is given in Table 1 below together with the temperature of saturated air delivered to the room.

TABLE 1.—COMPARISON OF PERFORMANCE OF CONVENTIONAL SYSTEM AND IMPROVED SYSTEMS OF FIG. 2 AND 3

| Equipment | Temperature of saturated air delivered to room, °F. | Coefficient of performance | Water efficiency, B.t.u. of cooling per lb. water |
|---|---|---|---|
| Conventional system (FIG. 1) | 57.5 | 0.28 | 1,000 |
| Improved system (FIG. 2) | 51.5 | 0.79 | 1,430 |
| Improved system (FIG. 3) | 46 | 0.77 | 1,610 |

It can be seen that the improved systems of FIGS. 2 and 3 have a coefficient of performance more than 2½ times as high as the conventional system of FIG. 1, and obtain 43% and 61% more cooling from the water used for systems of FIGS. 2 and 3, respectively. In addition, the air delivered to the room by the conventional system is at 57.5° F., far above the 45–50° F. level commonly used in hte air conditioning industry for equipment design.

It is intended that all matter contained in the above description or shown in the accompanying drawings shall be interpreted as illustrative and not in a limiting sense. It is to be understood that the following claims are intended to cover all of the generic and specific features of the invention herein described, and all statements of the scope of the invention, which, as a matter of language, might be said to fall therebetween.

We claim:
1. An open cycle recirculating air-conditioning system including at least a first and a second rotatable heat transfer wheel; a rotatable moisture transfer wheel; at least one evaporator; a burner; means defining a recirculating flow path for air to be conditioned; said heat transfer and moisture transfer wheels being disposed with respect to said flow path such that the air from an enclosed space to be conditioned passes sequentially through a first portion of said first heat transfer wheel, at least a portion of said moisture transfer wheel, a portion of said second heat transfer wheel, a second portion of said first heat transfer wheel in a direction opposite to the passage through said first portion, said evaporator and returned to said enclosed space; said system further including means defining flow paths for regenerative air, said burner and said moisture transfer wheel being disposed with respect to a first regenerative flow path such that regenerative air passes sequentially over said burner and through a portion of said moisture transfer wheel; said second heat transfer wheel being disposed with respect to a second regenerative flow path such that regenerative air passes through a portion of said second heat transfer wheel.

2. An open cycle air-conditioning system as claimed in claim 1, wherein said system includes a second evaporator said second evaporator being disposed with respect to said first heat transfer wheel and said flow path defining means such that the air to be conditioned passes through said evaporator prior to passing through said first portion of said first heat transfer wheel.

3. An open cycle air-conditioning system as claimed in claim 1, wherein said means defining flow paths for regenerative air are open to atmosphere said regenerative air being received therefrom.

4. An open cycle air-conditioning system as claimed in claim 1, wherein said moisture transfer wheel includes a lithium chloride drying agent.

5. An open cycle air-conditioning system as claimed in claim 1, wherein said means defining a flow path for said air to be conditioned is disposed with respect to said moisture transfer wheel such that the air to be conditioned passes through a first portion of said moisture transfer wheel in a first direction and a second portion of said moisture transfer wheel is an opposite direction.

6. An open cycle air-conditioning system as claimed in claim 5, wherein said system includes a third heat transfer wheel, said heat transfer wheel being disposed with respect to said flow path for air to be conditioned such that said air passing through said moisture transfer wheel in a first direction passes sequentially through a portion of said third heat transfer wheel prior to passing through said moisture transfer wheel in said opposite direction; and third heat transfer wheel being disposed with respect to said means defining flow paths for regenerative air such that regenerative air passes through said third heat transfer wheel.

References Cited

UNITED STATES PATENTS

| | | | |
|---|---|---|---|
| 2,926,502 | 3/1960 | Munters et al. | 62—94 |
| 2,964,298 | 12/1960 | McIntosh et al. | 165—7 |
| 2,968,165 | 1/1961 | Norback | 62—94 |
| 3,009,540 | 11/1961 | Munters | 165—7 X |
| 3,009,684 | 11/1961 | Munters | 165—7 X |
| 3,144,901 | 8/1964 | Meek | 62—271 X |

FOREIGN PATENTS 814,449  6/1959  Great Britain.

ROBERT A. O'LEARY, Primary Examiner
ALBERT W. DAVIS, Assistant Examiner

U.S. Cl. X.R.

55—34, 78, 390; 62—94; 165—7